Figure 1:
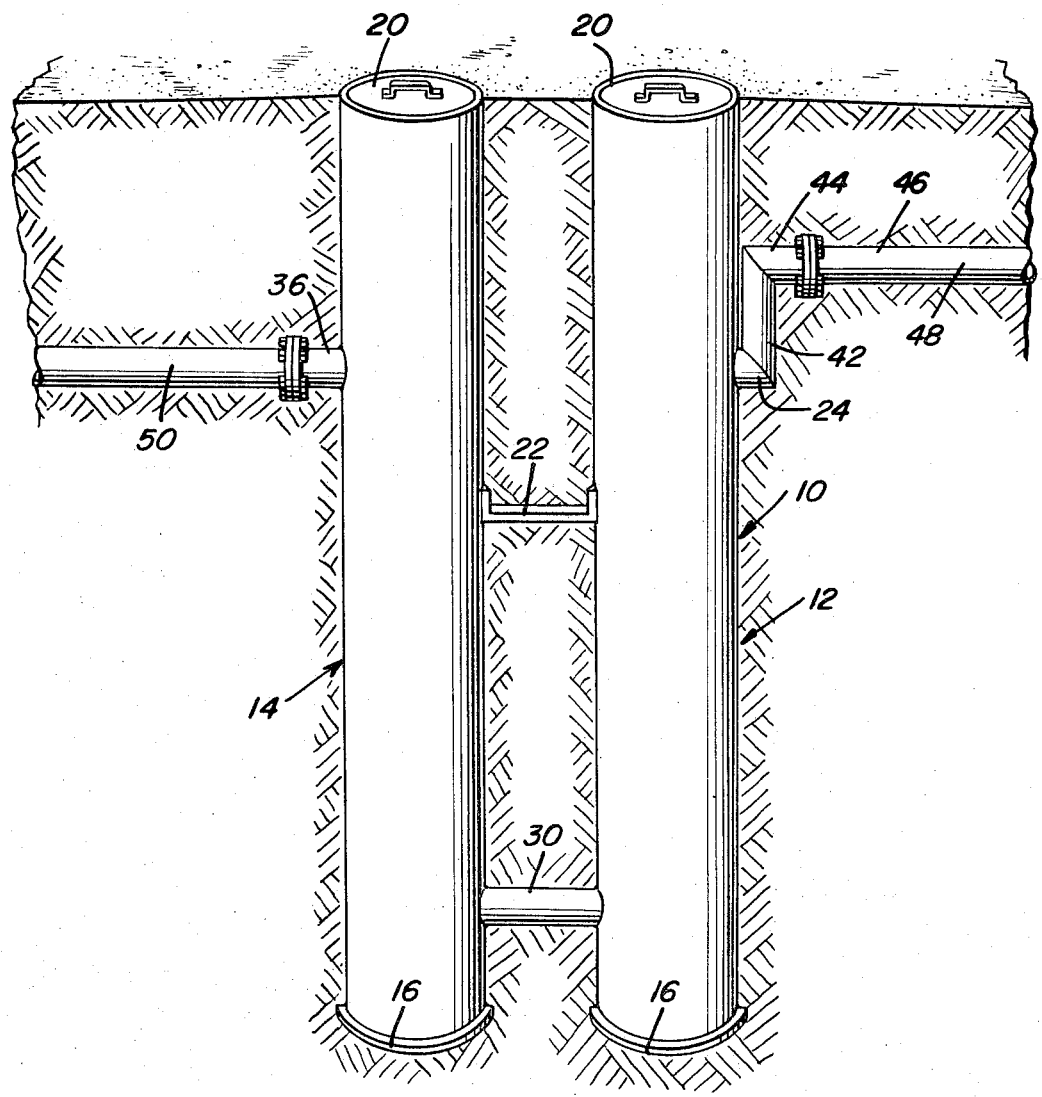

United States Patent [19]
Summers

[11] 3,862,039
[45] Jan. 21, 1975

[54] GRAVITY OIL-WATER SEPARATOR WITH TWO INTERCONNECTED SINGULAR CELLS HAVING AUTOMATIC FREE OIL DISCHARGE

[76] Inventor: Robert L. Summers, 5541 Twilight Rd., N.W., Roanoke, Va. 24019

[22] Filed: Sept. 17, 1973

[21] Appl. No.: 397,579

Related U.S. Application Data

[63] Continuation-in-part of Ser. No. 345,696, March 28, 1973.

[52] U.S. Cl.................. 210/252, 210/170, 210/540
[51] Int. Cl............................................. B01d 17/02
[58] Field of Search .......... 210/170, 252, 256, 338, 210/540

[56] References Cited
UNITED STATES PATENTS

| | | | |
|---|---|---|---|
| 654,965 | 7/1900 | Franke | 210/540 X |
| 835,216 | 11/1906 | Crozier | 210/256 |
| 1,297,171 | 3/1919 | Holley et al. | 210/252 X |
| 2,846,073 | 8/1958 | Hopper | 210/256 |

Primary Examiner—John Adee
Attorney, Agent, or Firm—Clarence A. O'Brien; Harvey B. Jacobson

[57] ABSTRACT

A pair of upstanding first and second tank components are provided. The tank components are closed at their lower ends and the first tank component includes an upper inlet opening thereinto at a level spaced below the upper end thereof while the second tank component includes an upper outlet opening outwardly therefrom at a level spaced below the upper end thereof and generally horizontally aligned with the inlet of the first component. The second component includes an upstanding lift passage in closed communication with the outlet of the second tank component at its upper end and opening downwardly into a lower interior portion of the second tank compartment at its lower end and a transfer passage is provided and communicates a lower portion of the interior of the first tank component with an upper portion of the interior of the second tank component. Further, the first tank component includes an oil outlet spaced at least slightly above the level of the inlet of the first tank component.

2 Claims, 3 Drawing Figures

3,862,039

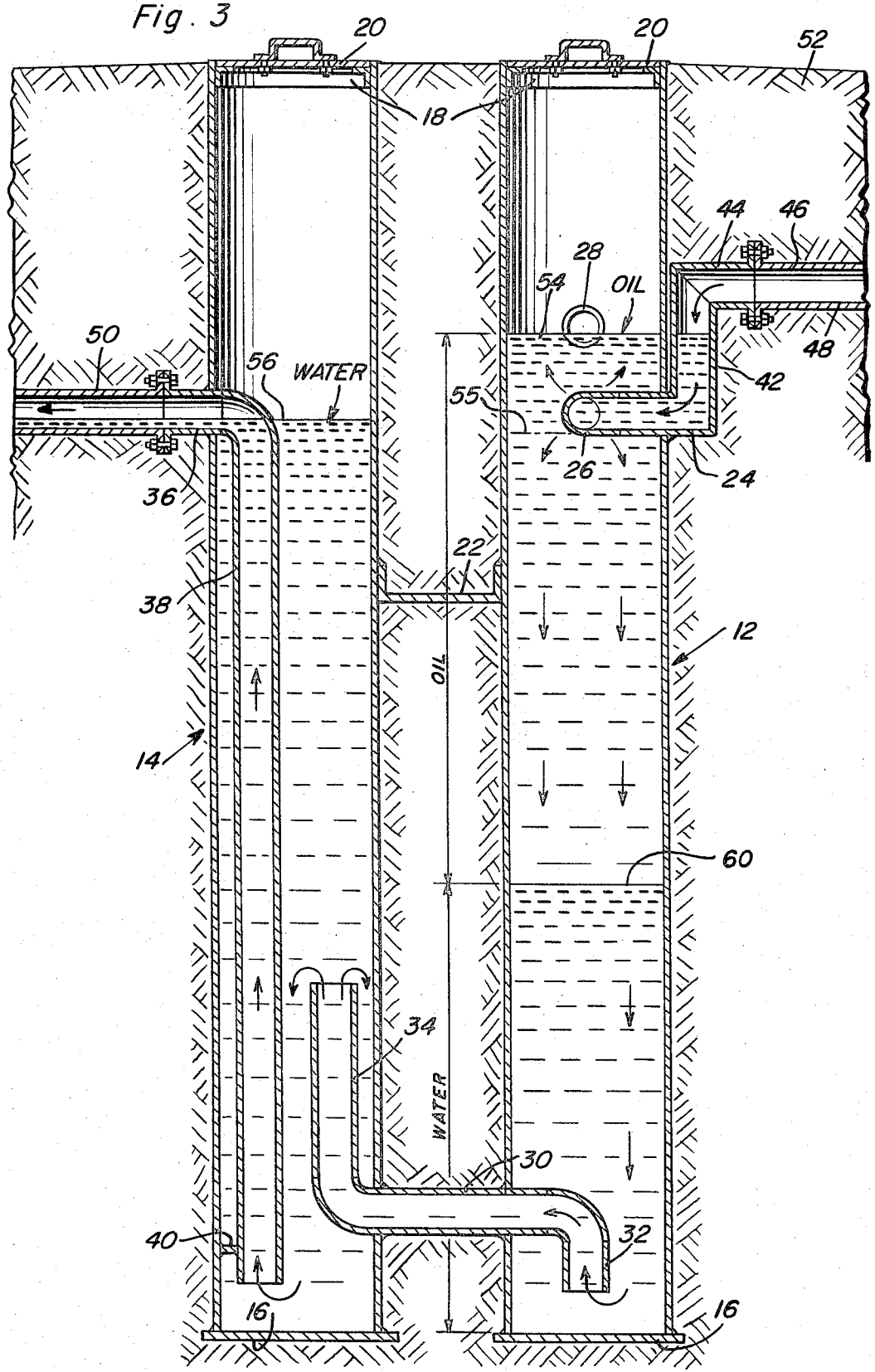

GRAVITY OIL-WATER SEPARATOR WITH TWO INTERCONNECTED SINGULAR CELLS HAVING AUTOMATIC FREE OIL DISCHARGE

This application comprises a continuation-in-part of my copending application U.S. Ser. No. 345,696, for Two Shell Gravity Oil-Water Separator, filed Mar. 28, 1973.

The separator of the instant invention has been designed to provide a means whereby different liquids such as oil and water may be separated and the oil may be automatically drained as it accumulates to a predetermined volume within the separator. The separator can be constructed to any desired size and includes conventional unsophisticated components which enable the separator to be constructed and maintained operative at a reasonably low cost.

The separator may be readily interposed within a generally horizontal liquid line whether the line be disposed above or below ground level. Still further, the separator is constructed so as to be extremely easy to service and capable of automatically draining the oil accumulated therein above a predetermined amount.

The main object of this invention is to provide a water and oil separator which may be utilized in numerous environments for the purpose of separating oil from drainage water.

Another object of this invention, in accordance with the immediately preceding object, is to provide a separator which will be capable of automatically draining excess oil accumulated within the separator above a predetermined volume and draining the oil from the upper level thereof.

A still further object of this invention is to provide a water and oil separator constructed in a manner whereby it may be readily serviced and periodically checked for maximum efficiency in operation.

A final object of this invention to be specifically enumerated herein is to provide a separator which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 2:
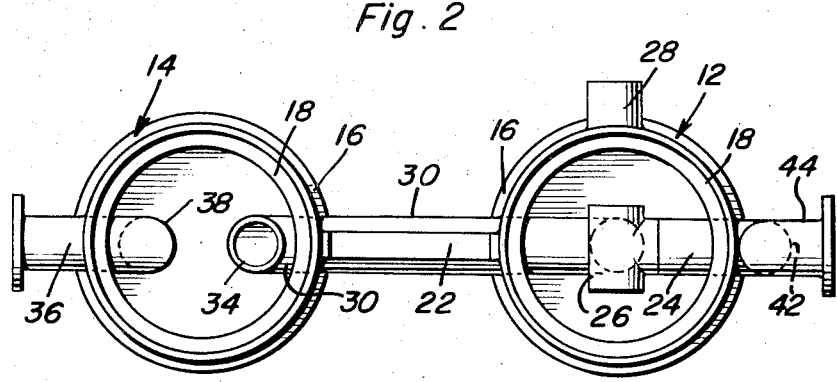

FIG. 1 is a perspective view of the oil and water separator of the instant invention shown installed within a generally horizontal flow line and with the upper extremities of the first and second tank components thereof being flush with the ground in which the separator is recessed;

FIG. 2 is an enlarged top plan view of the separator with the covers for the first and second tank components thereof removed; and FIG. 3 is an enlarged vertical sectional view of the separator illustrated as serially connected within a drain line disposed below ground level and taken substantially upon a plane passing through the center axes of the first and second parallel upstanding tank components of the separator.

Referring now more specifically to the drawings the numeral 10 generally designates the separator of the instant invention which includes first and second generally parallel upstanding cylindrical tank components referred to in general by the reference numerals 12 and 14. The tank components 12 and 14 each are closed at their lower ends by means of a bottom wall 16 and each of the tank components includes an upper inner circumferentially extending annular angle member 18 upon which a removable closure 20 is supported.

A short horizontal brace member 22 is rigidly secured between vertical mid-portions of the tank components 12 and 14 and the first tank component 12 includes an inlet pipe 24 opening horizontally through one upper side wall portion thereof a spaced distance below the upper end of the tank component 12. The inlet pipe 24 terminates inwardly in a horizontal T-fitting 26 and the first tank component 12 includes an oil outlet 28 a spaced distance above the inlet pipe 24 but also spaced below the upper end of the first tank component 12. The oil outlet 28 comprises a pipe opening horizontally through the corresponding side wall portion of the tank 12.

A horizontal water transfer pipe 30 opens inwardly through horizontally aligned opposing wall portions of the tank components 12 and 14 and the end of the transfer pipe 30 opening into the tank component 12 terminates inwardly in a downturned inlet portion 32 which opens downwardly at an elevation spaced only slightly above the bottom wall 16 of the first tank component 12. The end of the transfer pipe 30 opening into the lower end of the second tank component 14 terminates in an upwardly directed vertical outlet portion 34 opening upwardly into the interior of the second tank component 14 at an elevation spaced appreciably above the bottom wall 16 of the second tank component 14.

The second tank component 14 includes a water outlet pipe 36 which is secured through an upper wall portion of the second tank component 14 in generally horizontal alignment with the inlet pipe 24. The end of the outlet pipe 36 which opens into the second tank component 14 terminates inwardly in a vertically disposed lift pipe 38 which extends downwardly from the outlet pipe 36 to a point spaced only slightly above the bottom wall 16 of the second tank component 14 and appreciably below the upper end of the vertical outlet portion 34 of the transfer pipe 30. The lower end of the lift pipe 38 is braced relative to the adjacent side wall portion of the second tank component 14 as at 40.

The inlet pipe 24 terminates outwardly of the first tank component 12 in an upstanding section 42 thereof in turn terminating upwardly in an outwardly directed horizontal section 44. The inlet end of the horizontal section 44 is coupled to the outlet end of a first section 46 of a horizontal flow line 48 and the outlet end of the outlet pipe 36 is coupled to the inlet end of a second section 50 of the horizontal flow line 48.

In operation, after the separator 10 has been recessed within the ground 52 with the upper ends of the tank components 12 and 14 substantially flush with the upper surface of the ground 52 and serially connected in the flow line 48, a quantity of water sufficient to fill the tank components 12 and 14 to the levels 55 and 56 therein may be admitted into the tank components 12 and 14 through the upper end of the tank 12. Of course, the initial quantity of water to be introduced into the tank components 12 and 14 may also be introduced into the tank component 14 through the upper end thereof, but the water level within the tank component 12 will then only be equal to the level 56 in the tank component 14. Thereafter, a valve (not shown) controlling the flow of a water and oil mixture through the line 48 may be opened in order to allow the mixture of oil and water to flow into the tank component 12. As the mixture flows into the tank component 12 the oil portion of the mixture will tend to rise in the tank 12 and the water portion of the mixture will tend to flow downwardly in the tank component 12. As soon as sufficient oil has been collected within the tank component 12 to define the interface 60 between the quantity of oil in the upper portion of the tank component 12 and the water in the lower portion of the tank component 12, the introduction of additional water and oil mixture into the separator 10 will cause oil to flow from the oil outlet 28. Inasmuch as oil is lighter than water the column of liquid in the tank component 12 has its level at a higher elevation 54 than the level of pure water in the tank component 14. Therefore, even though pure water flows out of the outlet pipe 36 at a lower level oil will flow from the outlet line 28 at a higher level from within the tank component 12.

As the water entering the tank component 12 falls to the bottom thereof, the water moves upwardly through the inlet pipe 32, through the transfer pipe 30 and into the interior of the second tank component 14 through the vertical outlet portion 34 of the transfer pipe 30. Should there be any oil remaining in the liquid flowing through the transfer pipe 30, this slight residue of oil will be elevated to the level 56 and there will be substantially no oil within the liquid entering the lower end of the lift pipe 38 for discharging from the second tank component 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gravity separator comprising a tank assembly including side-by-side first and second tank components, said first tank component including an upper inlet opening thereinto at a level spaced below the upper end thereof, said second component including an upper outlet opening outwardly therefrom below the upper end thereof at generally the same level, said second component including means defining an upstanding lift passage in closed communication with the outlet opening at its upper end and opening downwardly into a lower interior portion of said second component at its lower end, and means defining a transfer passage having inlet and outlet ends communicated with a lower portion of the interior of the first component and the interior of the second component at a level spaced above the lower end of the lift passage, said first tank component including a free flowing oil outlet disposed at a level spaced slightly above said upper outlet, the upper ends of said first and second tank components including removable closures therefor, said upper inlet and said upper outlet opening through upstanding side wall portions of said first and second tank components.

2. The combination of claim 1 wherein said outlet end of said transfer passage opens into the interior of the second tank component at an elevation spaced appreciably above the elevation of the inlet end of said tranfer passage in said first tank component.

* * * * *